United States Patent
Nesta et al.

(10) Patent No.: US 11,158,333 B2
(45) Date of Patent: Oct. 26, 2021

(54) MULTI-STREAM TARGET-SPEECH DETECTION AND CHANNEL FUSION

(71) Applicant: SYNAPTICS INCORPORATED, San Jose, CA (US)

(72) Inventors: Francesco Nesta, Aliso Viejo, CA (US); Saeed Mosayyebpour Kaskari, Irvine, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 3 days.

(21) Appl. No.: 16/706,519

(22) Filed: Dec. 6, 2019

(65) Prior Publication Data

US 2020/0184985 A1 Jun. 11, 2020

Related U.S. Application Data

(60) Provisional application No. 62/776,422, filed on Dec. 6, 2018.

(51) Int. Cl.
*G10L 21/0364* (2013.01)
*G10L 25/60* (2013.01)
(Continued)

(52) U.S. Cl.
CPC .......... *G10L 21/0364* (2013.01); *G10L 15/22* (2013.01); *G10L 25/60* (2013.01); *G10L 25/84* (2013.01); *H04R 1/406* (2013.01); *H04R 3/005* (2013.01); *H04S 3/008* (2013.01); *H04L 65/60* (2013.01); *H04S 2400/01* (2013.01)

(58) Field of Classification Search
CPC ..... G10L 21/0364; G10L 25/60; G10L 15/22; G10L 25/84; G10L 21/02; G10L 15/20; G10L 21/0216; G10L 21/0272; G10L 25/78; G10L 2021/02087; G10L 2015/088; G10L 2021/02165; G10L 2021/02161; G10L 2021/02166; H04R 3/005; H04R 1/406; H04R 2430/23; H04R 3/008; H04S 2400/01; H04S 3/008; H04L 65/60; H04L 65/608; H04L 65/80
See application file for complete search history.

(56) References Cited

U.S. PATENT DOCUMENTS 9,734,822 B1 * 8/2017 Sundaram ............... G10L 17/22
2018/0350379 A1 * 12/2018 Wung ................. G10L 21/0364

* cited by examiner

*Primary Examiner* — Yogeshkumar Patel
(74) *Attorney, Agent, or Firm* — Paradice & Li LLP

(57) ABSTRACT

Audio processing systems and methods include an audio sensor array configured to receive a multichannel audio input and generate a corresponding multichannel audio signal and target-speech detection logic and an automatic speech recognition engine or VoIP application. An audio processing device includes a target speech enhancement engine configured to analyze a multichannel audio input signal and generate a plurality of enhanced target streams, a multi-stream target-speech detection generator comprising a plurality of target-speech detector engines each configured to determine a probability of detecting a specific target-speech of interest in the stream, wherein the multi-stream target-speech detection generator is configured to determine a plurality of weights associated with the enhanced target streams, and a fusion subsystem configured to apply the plurality of weights to the enhanced target streams to generate an enhancement output signal.

20 Claims, 4 Drawing Sheets

(51) Int. Cl.
*G10L 15/22* (2006.01)
*G10L 25/84* (2013.01)
*H04R 1/40* (2006.01)
*H04R 3/00* (2006.01)
*H04S 3/00* (2006.01)
*H04L 29/06* (2006.01)

MULTI-STREAM TARGET-SPEECH DETECTION AND CHANNEL FUSION

CROSS-REFERENCE TO RELATED APPLICATIONS

This application claims priority to and the benefit of U.S. Provisional Patent Application No. 62/776,422 filed Dec. 6, 2018 and entitled "MULTI-STREAM TARGET-SPEECH DETECTION AND CHANNEL FUSION", which is hereby incorporated by reference in its entirety.

TECHNICAL FIELD

The present application, in accordance with one or more embodiments, relates generally to systems and methods for audio processing and, more particularly, for example, to detecting, tracking and/or enhancing one or more audio targets for keyword detection.

BACKGROUND

Human-computer interfaces (HCI) based on audio interaction have become very popular in the recent years with the advent of smart speakers, voice-controlled devices and other devices incorporating voice interactions. In voice activated systems, the interaction is generally obtained in two stages: (i) activating the system by uttering a specific activation keyword, and then (ii) uttering a specific question or voice command to be processed by the system. The first stage is generally handled by an automatic keyword spotting (KWS) algorithm to recognize specific words embedded in noisy audio signals. The second stage is generally handled by a natural language and automatic speech recognition system. While current systems provide generally acceptable results for many real-world scenarios, results often suffer with the presence of strong noise in the environment. Similarly, in far-field VoIP applications, it is often required to stream only a particular target speech of interest which is a difficult task in the presence of loud noise or other interfering speakers. There is therefore a continued need for improved systems and methods for keyword spotting and speech enhancement in noisy environments for both ASR and VoIP applications.

SUMMARY

The present disclosure provides methods and systems for detecting, tracking and/or enhancing a target audio source, such as human speech, in a noisy audio signal. Audio processing systems and methods include an audio sensor array configured to receive a multichannel audio input and generate a corresponding multichannel audio signal and target-speech detection logic and an automatic speech recognition engine. An audio processing device includes a target speech enhancement engine configured to analyze a multichannel audio input signal and generate a plurality of enhanced target streams, a multi-stream pre-trained Target-Speech detection engine comprising a plurality of pre-trained detector engines each configured to determine a probability of detecting a target-speech in the stream, wherein the multi-stream target-speech detection generator is configured to determine a plurality of weights associated with the enhanced target streams, and a fusion subsystem configured to apply the plurality of weights to the enhanced target streams to generate an enhancement output signal.

In one or more embodiments, a method includes analyzing, using a target speech enhancement engine, a multichannel audio input signal and generating a plurality of enhanced target streams, determining a probability of detecting a target-speech in the stream using a multi-stream target-speech detector generator, calculating a weight for each of the enhanced target streams, and applying the calculated weights to the enhanced target streams to generate an enhanced output signal. The method may further comprise sensing human speech and environmental noise, using an audio sensor array, and generating a corresponding the multichannel audio input signal, producing a higher posterior with clean speech, determining a combined probability of detecting the target-speech in the streams; and wherein the target-speech is detected if the combined probability exceeds a detection threshold, and/or performing automatic speech recognition on the enhanced output signal if the target-speech is detected.

In some embodiments, analyzing the multichannel audio input signal comprises applying a plurality of speech enhancement modalities, each speech enhancement modality outputting a separate one of the enhanced target streams. The plurality of speech enhancement modalities may comprise an adaptive spatial filtering algorithm, a beamforming algorithm, a blind source separation algorithm, a single channel enhancement algorithm, and/or a neural network. Determining the probability of detecting the target-speech in the stream may comprise applying Gaussian Mixture Models, Hidden Markov Models, and/or a neural network, and/or producing a posterior weight correlated to a confidence that the input stream includes a keyword. In some embodiments, the enhanced output signal is a weighted sum of the enhanced target streams.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1:
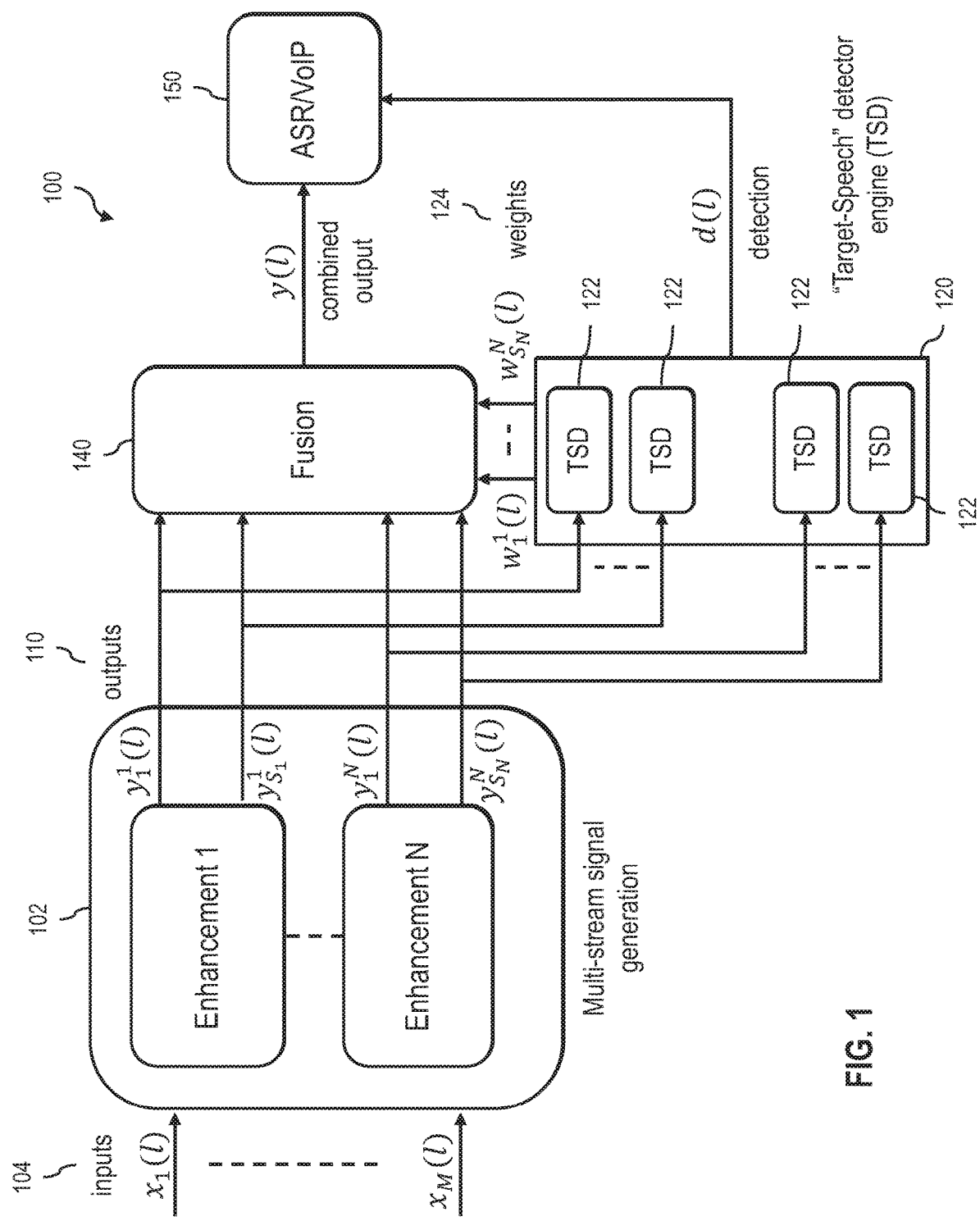
FIG. 1 illustrates an example of multistream target-speech spotting and stream signal fusion, in accordance with one or more embodiments of the present disclosure.

Disclosed herein are systems and methods for detecting, tracking and/or enhancing a target audio source, such as human speech, in a noisy audio signal. The systems and methods include improved multi-stream target-speech detection and channel fusion.

In various embodiments, a voice activated system operates by having a user (i) activating the system by uttering a specific activation keyword, and then (ii) uttering a specific question or voice command to be processed by the system. The first stage is handled by an automatic keyword spotting (KWS) algorithm which uses machine learning methods to recognize specific words embedded in noisy audio signals. The second stage is handled by a natural language and automatic speech recognition system which generally runs on a cloud server. The embodiments disclosed herein include improved multichannel speech enhancement to preprocess the audio signal before to be fed to the KWS, sent to the cloud ASR engine or streamed through a VoIP application On-line multichannel speech enhancement techniques for reducing noise from audio signals suffer some conceptual limitations which are addressed in the present disclosure to improve the usability of voice-enabled devices. For example, on-line multichannel speech enhancement techniques typically require a clear definition of what constitutes the target speech to be enhanced. This definition can be made through a voice activity detector (VAD) or by exploiting some geometrical knowledge as for example the expected source direction of arrival (DOA). Multichannel systems based on VAD can generally reduce noise that does not contain speech. However, in many scenarios the noise source might contain speech content that is identified as voice activity, such as audio from a television or radio and speech from a competing talker. On the other hand, enhancement methods based on geometrical knowledge require prior knowledge on the physical position of the desired talker. For hands-free far-field voice applications, this position is often unknown and may be difficult to determine without ambiguity if two talkers are present in the same environment. Another limitation of on-line multichannel speech enhancement techniques, is that they are mostly effective when the talker's position is invariant with the respect to the microphones. If the talker's position changes drastically, the filtering parameters need to adapt to the new geometrical configuration and during the adaptation the signal quality might be seriously degraded.

One approach that partially solves the limitations of VAD-based enhancement is multichannel blind source separation (BSS). BSS methods can produce an estimation of the output source signals without the explicit definition of what is the target source of interest. In fact, they only try to decompose the mixtures in its individual spatial components, e.g., the individual sound source propagating from different physical locations in the 3D space. This allows BSS to be successfully adopted to separate the signals associated with multiple talkers. However, in practical applications there is still a need for defining a posteriori what is the "target" speech of interest.

To solve the aforementioned issues, a system architecture is disclosed herein that combines multichannel source enhancement/separation with parallel pre-trained detectors to spot particular speech of interest. Multiple streams are generated and fed to multiple detectors which are trained to recognize a specific signal/source of interest. The likelihood of the detection is then used to generate weights used to combine all the streams into a single stream which is comprised or dominated by the streams with a higher confidence of detection.

In various embodiments, the system architecture disclosed herein can improve the KWS detection performance for ASR applications, in scenarios where there is a persistent noise source overlapping speech. An example of this scenario is when there is a TV playing a continuous loud audio signal while the user wants to interact with the system. The system architecture can also produce an optimal enhanced output signal for the ASR engine, by combining the best output signals according to the target-speech detector response.

Referring to FIG. 1, an example of target-speech detector system 100 is illustrated, in accordance with one or more embodiments of the present application. The system 100 comprises multi-stream signal generation subsystem 102, a multi-stream target-speech detector (TSD) engine 120; and (iii) a fusion subsystem 140.

The multi-stream signal generation subsystem 102 comprises a plurality of N different speech enhancement modules, each speech enhancement module using different enhancement separation criteria. In various embodiments, the enhancement separation criteria may include: (i) adaptive spatial filtering algorithms such as beamforming with different fixed or adaptive looking directions, (ii) fixed beamforming algorithms, e.g. delay and sum beamforming, cardioid configurations, etc., (iii) blind source separation algorithms producing multiple outputs related to independent sources, (iv) traditional single channel enhancement based on speech statistical models and signal-to-noise ratio (SNR) tracking, (v) data-driven speech enhancement methods such as based on Non-Negative Matrix Factorization (NMF) or Neural Networks, and/or (vi) other approaches. Each module might produce a different number of output streams $S_N$ which would depend on the particular algorithm used for the speech enhancement.

The output streams 110 produced by the multi-stream signal generation subsystem 102 are fed to the plurality of parallel TSD engines 122. The TSD engines 122 can be based on target speech/speaker or keyword spotting techniques, including traditional Gaussian Mixture Models and Hidden Markov Models, and/or recurrent neural networks such as long short-term memory (LSTM), gated recurrent unit (GRU), and other neural networking techniques. Each TSD engine 122 is configured to produce a posterior weight 124 that is correlated to a confidence that the input signal to the corresponding TSD engine 122 contains the specific trained target speech. In some embodiments, the TSD engines 122 are trained to be biased to produce a higher posterior with clean speech (e.g., by limiting the amount of noise in the training data). Therefore, since the input signals 104 fed to the multi-stream signal generation stage are the same, a higher posterior implies that the corresponding input speech signal would be closer to be clean and undistorted. In various embodiments, the weights 124 are obtained by normalizing the individual TSD posteriors $p_{s_n}^n(l)$ as:

$$w_{s_n}^n(l) = \frac{p_{s_n}^n(l)}{\sum_s \sum_n p_{s_n}^n(l)}$$

The fusion subsystem 140 uses the weights 124 and applies a programmable heuristic to combine the output streams 110. The combination could be obtained as a weighted sum of the signal as $y(l)=\Sigma_s\Sigma_n f(w_{s_n}^n(l)) \times y_{s_n}^n(l)$, where $f(\cdot)$ is a non-linear function of the weights (e.g., "max" operator or other contrast functions). A more sophisticated combination could be employed by using a function $f(\cdot)$ with memory, such as exploiting temporal consistency of the channels. For example, if the weights of some streams are similar to each other, the fusion subsystem could be biased to select the contribution of the same channel, thus reducing signal discontinuities. In some embodiments, a dynamical order of priority could be defined.

The TSD engine 120 further comprises a programmable logic configured to produce a combined posterior for the target-speech detection d(l). This posterior may be used for the final detection which can be defined as:

$$d_{s_n}^n(l) = p_{s_n}^n(l) > th_{s_n}^n$$

$$d(l) = L[d_{1_1}^1(l), \ldots, d_{S_N}^N(l)]$$

where $th_{s_n}^n$ is a detection threshold for the detection connected to the output $y_{s_n}^n(l)$ and $L[\ldots]$ is a function which computes the combined detection from the individual detections and could be realized as a combination of logic operators. The combined output y(l) and detection d(l) are then fed to an automatic speech recognition engine 150, which may be implemented on the cloud, a network server, or other host system.

In view of the foregoing, one or more embodiments of the present disclosure include a system comprising a target speech enhancement engine configured to analyze a multi-channel audio input signal and generate a plurality of enhanced target streams, a multi-stream target-speech detector generator comprising a plurality of target-speech detector engines each configured to determine a confidence of quality and/or presence of a specific target-speech in the stream, wherein the multi-stream target-speech detection generator is configured to determine a plurality of weights associated with the enhanced target streams, and a fusion subsystem configured to apply the plurality of weights to the enhanced target streams to generate a combined enhanced output signal.

The system may further include an audio sensor array configured to sense human speech and environmental noise and generate a corresponding the multichannel audio input signal. In some embodiments, the target speech enhancement engine includes a plurality of speech enhancement modules, each speech enhancement module configured to analyze the multichannel audio input signal and output one of the enhanced target streams, and including an adaptive spatial filtering algorithm, a beamforming algorithm, a blind source separation algorithm, a single channel enhancement algorithm, and/or a neural network. In some embodiments, the target-speech detector engines comprise Gaussian Mixture Models, Hidden Markov Models, and/or a neural network, and are configured to produce a posterior weight correlated to a confidence that an input audio stream includes the specific target speech.

Figure 2:
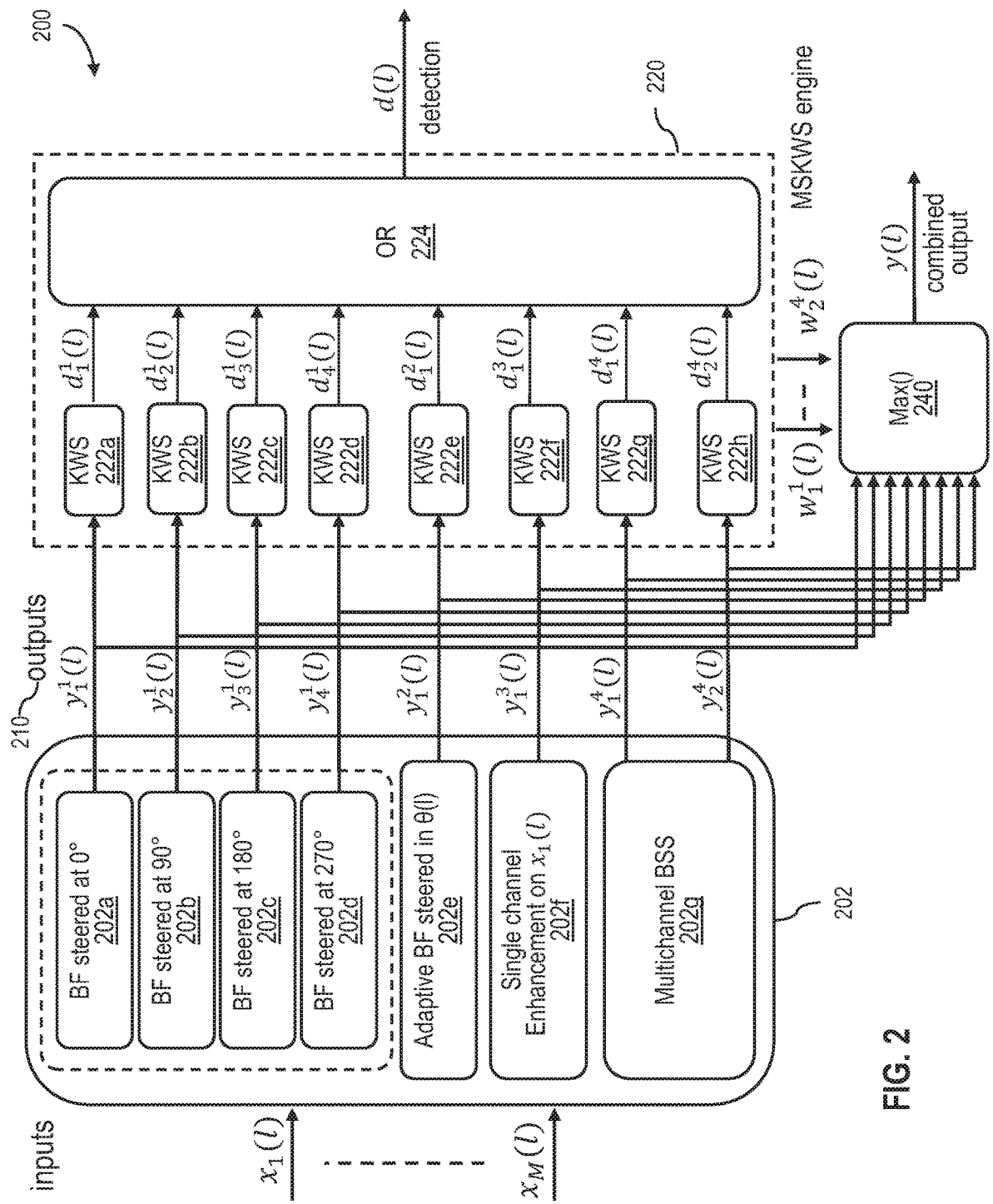
FIG. 2 illustrates an example implementation of a multistream keyword spotting system, in accordance with one or more embodiments of the present disclosure.

Referring to FIG. 2; an example of a possible practical implementation for the system will now be described. The illustrated example refers to a case where a goal is to select the stream containing a specific speech keyword and with the highest speech quality. A keyword spotting system 200 comprises a multi-stream signal generation subsystem 202, a Multi Stream KWS (MSKWS) engine 220; and (iii) a fusion subsystem 240. The multi-stream signal generation subsystem 202 comprises a plurality of speech enhancement modules 202a-g, with each speech enhancement module using different enhancement separation criteria. The output streams 210 produced by the multi-stream signal generation subsystem 202 are fed to the plurality of parallel KWS engines 222a-h. Each KWS engine 222a-h is configured to produce a corresponding posterior weight $w_{s_n}^n$ that is correlated to a confidence that the input signal to the corresponding KWS engine 222a-h contains the specific trained keyword.

The fusion subsystem 240 uses the signal weights $w_{s_n}^n$ and is programmed to combine the output streams 210 to produce a combined output y(l). The MSKWS engine 220 further comprises a programmable logic 224 configured to produce a combined posterior for the KWS detection d(l). The combined output y(l) and detection d(l) are then fed to an automatic speech recognition engine for further processing.

In this example, four different "enhancement" algorithm categories are defined. The first category produces four enhanced output streams by using a beamformer steered in different predefined directions (enhancement blocks 202a, 202b, 202c, and 202d). Each beamformer combines multiple input signals in order to suppress noise while maintaining unitary gain in the steering direction. The beamformer algorithm could be a fixed filter-and-sum, such as Delay and Sum (D&S), or an adaptive one like Minimum Variance Distortionless Response (MVDR).

The second category is represented by the adaptive beamformer (enhancement block 202e) steered in the direction θ(l), where this direction is adapted on-line with the incoming data. For example, a voice activity detection (VAD) can be employed to update the direction θ(l). θ(l) could be also derived from other multimodal signals, such as video captures, active ultrasound imaging, RFID gradient maps, etc. A goal of this enhancement algorithm is to provide a more accurate output signal if the estimate of θ(l) is reliable. Note, this category can produce more output streams if multiple directions θ(l) are available. For example, a system for tracking multiple sound sources could estimate the angular directions and elevations of the most dominant sources. The adaptive beamforming will then produce multiple streams enhanced in these directions but only one of those streams will contain the speech of the system user. The enhanced signal itself could be obtained through MVDR or Generalized Eigen Value (or maxSNR) beamformers.

The third category is represented by an enhancement method which does not rely on any spatial cue as for the algorithms in the first and second categories (e.g., single channel enhancement block 202f. This method will have a goal to enhance any noise, by only estimating the noise spectral statistic which could be derived from a single channel observation. The method could be realized through traditional data independent SNR-based speech enhancement (e.g. such as Wiener Filtering) or through data-dependent or model-based algorithms (e.g. spectral mask estimation through Deep Neural Networks or NMF).

The fourth category is represented by a BSS algorithm (202g) which decomposes the inputs in statistically independent output streams. This method would separate the target speech from noise or other interfering speech sources and could be implemented through Independent Vector Analysis, Independent Component Analysis, Multichannel NMF, Deep Clustering or through other methods for unsupervised source separation.

In the illustrated embodiment, four different categories of enhancements are selected such that each is characterized by a different specific behavior in different real-world conditions. For example, the output signal in the first category is expected to produce a good output signal if the user is located in the steering direction and the amount of reverberation is negligible. However, if these conditions are not met the output could be sensibly distorted. On the other hand, the approach in the second category is able to adapt to the true sound source directions as those are updated with the data. On the other hand, if the noise is located in the same direction of the target speech, the fourth method based on BSS will provide better separated streams as compared to directional beamforming. At the same time, if the sources are moving or are intermittingly active, there will be an intrinsic uncertainty in the user direction or BSS filter estimations. In these conditions the signal provided by the third category could be more reliable, as it would be completely independent on the source spatial information.

By having output streams generated by techniques belonging to orthogonal categories, the system is able to produce at least one output stream that is optimal for the specific scenario that is observed. The KWS engines will then be applied to all the streams to produce the final detection and to produce the combined output sent to the natural language ASR engine. In this example, the stream having the maximum (normalized) detection posterior is selected:

$$y_{s_n,n}(l) \text{ with } (s,n) = \text{argmax}_{s,n}(w_{s_n}^n)$$

In addition, the final detection state in the illustrated embodiment is determined as the logic OR combination of all the individual trigger detections. It will be appreciated that the system described in FIG. 2 is only an example to help better understand the scope of the general structure described in FIG. 1 and elsewhere herein, and that different system implementations are within the scope of the present disclosure. Although the illustrated system was targeted to improve KWS detection and channel selection for ASR applications, in other embodiments the architecture disclosed herein may be modified for other applications. For example, rather than using a KWS engine as described in FIG. 2, a recurrent neural network can be implemented to predict the speech activity or produce a normalized score related to the average SNR to predict the quality of the signal and thus produce a combined channel which could be used for Voice-over-IP (VoIP) applications. Thus, the posteriors of these networks would give an indication on how to combine the streams to maximize the SNR for VoIP applications. In another embodiment the KWS could be replaced by a voice authentication system (VA) in order to focus only on the channels containing the speech of a specific talker.

Figure 3:
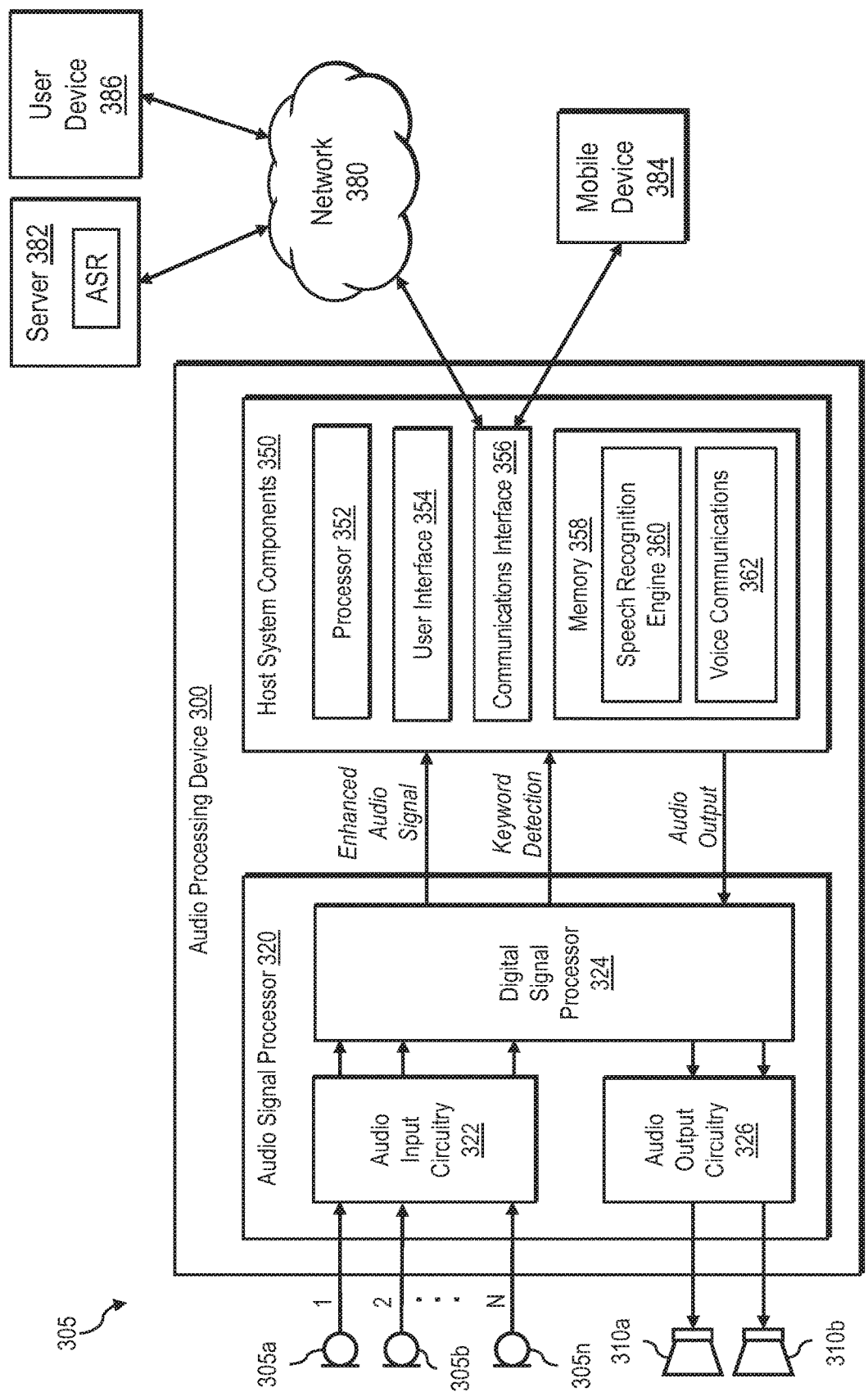
FIG. 3 illustrates an example keyword spotting system, in accordance with one or more embodiments of the present disclosure.

FIG. 3 illustrates an audio processing device 300 that may implement the keyword spotting subsystems, according to various embodiments of the disclosure. The audio processing device 300 includes an audio input, such as an audio sensor array 305, an audio signal processor 320 and host system components 350. The audio sensor array 305 comprises one or more sensors, each of which may convert sound waves into an audio signal. In the illustrated environment, the audio sensor array 305 includes a plurality of microphones 305a-305n, each generating one audio channel of a multi-channel audio signal.

The audio signal processor 320 includes audio input circuitry 322, a digital signal processor 324 and optional audio output circuitry 326. In various embodiments the audio signal processor 320 may be implemented as an integrated circuit comprising analog circuitry, digital circuitry and the digital signal processor 324, which is configured to execute program instructions stored in memory. The audio input circuitry 322, for example, may include an interface to the audio sensor array 305, anti-aliasing filters, analog-to-digital converter circuitry, echo cancellation circuitry, and other audio processing circuitry and components.

The digital signal processor 324 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure.

The digital signal processor 324 is configured to process the multichannel digital audio input signal to generate an enhanced audio signal, which is output to one or more host system components 350. In one embodiment, the digital signal processor 324 is configured to interface and communicate with the host system components 350, such as through a bus or other electronic communications interface. In various embodiments, the multichannel audio signal includes a mixture of noise signals and at least one desired target audio signal (e.g., human speech), and the digital signal processor 324 is configured to isolate or enhance the desired target signal, while reducing or cancelling the undesired noise signals. The digital signal processor 324 may be configured to perform echo cancellation, noise cancellation, target signal enhancement, post-filtering, and other audio signal processing.

The optional audio output circuitry 326 processes audio signals received from the digital signal processor 324 for output to at least one speaker, such as speakers 310a and 310b. In various embodiments, the audio output circuitry 326 may include a digital-to-analog converter that converts one or more digital audio signals to corresponding analog signals and one or more amplifiers for driving the speakers 310a and 310b.

The audio processing device 300 may be implemented as any device configured to receive and detect target audio data, such as, for example, a mobile phone, smart speaker, tablet, laptop computer, desktop computer, voice-controlled appliance, or automobile. The host system components 350 may comprise various hardware and software components for operating the audio processing device 300. In the illustrated embodiment, the host system components 350 include a processor 352, user interface components 354, a communications interface 356 for communicating with external devices and networks, such as network 380 (e.g., the Internet, the cloud, a local area network, or a cellular network) and mobile device 384, and a memory 358.

The processor 352 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The host system components 350 are configured to interface and communicate with the audio signal processor 320 and the other system components 350, such as through a bus or other electronic communications interface.

It will be appreciated that although the audio signal processor 320 and the host system components 350 are shown as incorporating a combination of hardware components, circuitry and software, in some embodiments, at least some or all of the functionalities that the hardware components and circuitries are configured to perform may be implemented as software modules being executed by the processor 352 and/or digital signal processor 324 in response to software instructions and/or configuration data, stored in the memory 358 or firmware of the digital signal processor 324.

The memory 358 may be implemented as one or more memory devices configured to store data and information, including audio data and program instructions. Memory 358 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 352 may be configured to execute software instructions stored in the memory 358. In various embodiments, a speech recognition engine 360 is configured to process the enhanced audio signal received from the audio signal processor 320, including identifying and executing voice commands. Voice communications components 362 may be configured to facilitate voice communications with one or more external devices such as a mobile device 384 or user device 386, such as through a voice call over a mobile or cellular telephone network or a VoIP call over an IP (internet protocol) network. In various embodiments, voice communications include transmission of the enhanced audio signal to an external communications device.

The user interface components 354 may include a display, a touchpad display, a keypad, one or more buttons and/or other input/output components configured to enable a user to directly interact with the audio processing device 300.

The communications interface 356 facilitates communication between the audio processing device 300 and external devices. For example, the communications interface 356 may enable Wi-Fi (e.g., 802.11) or Bluetooth connections between the audio processing device 300 and one or more local devices, such as mobile device 384, or a wireless router providing network access to a remote server 382, such as through the network 380. In various embodiments, the communications interface 356 may include other wired and wireless communications components facilitating direct or indirect communications between the audio processing device 300 and one or more other devices.

Figure 4:
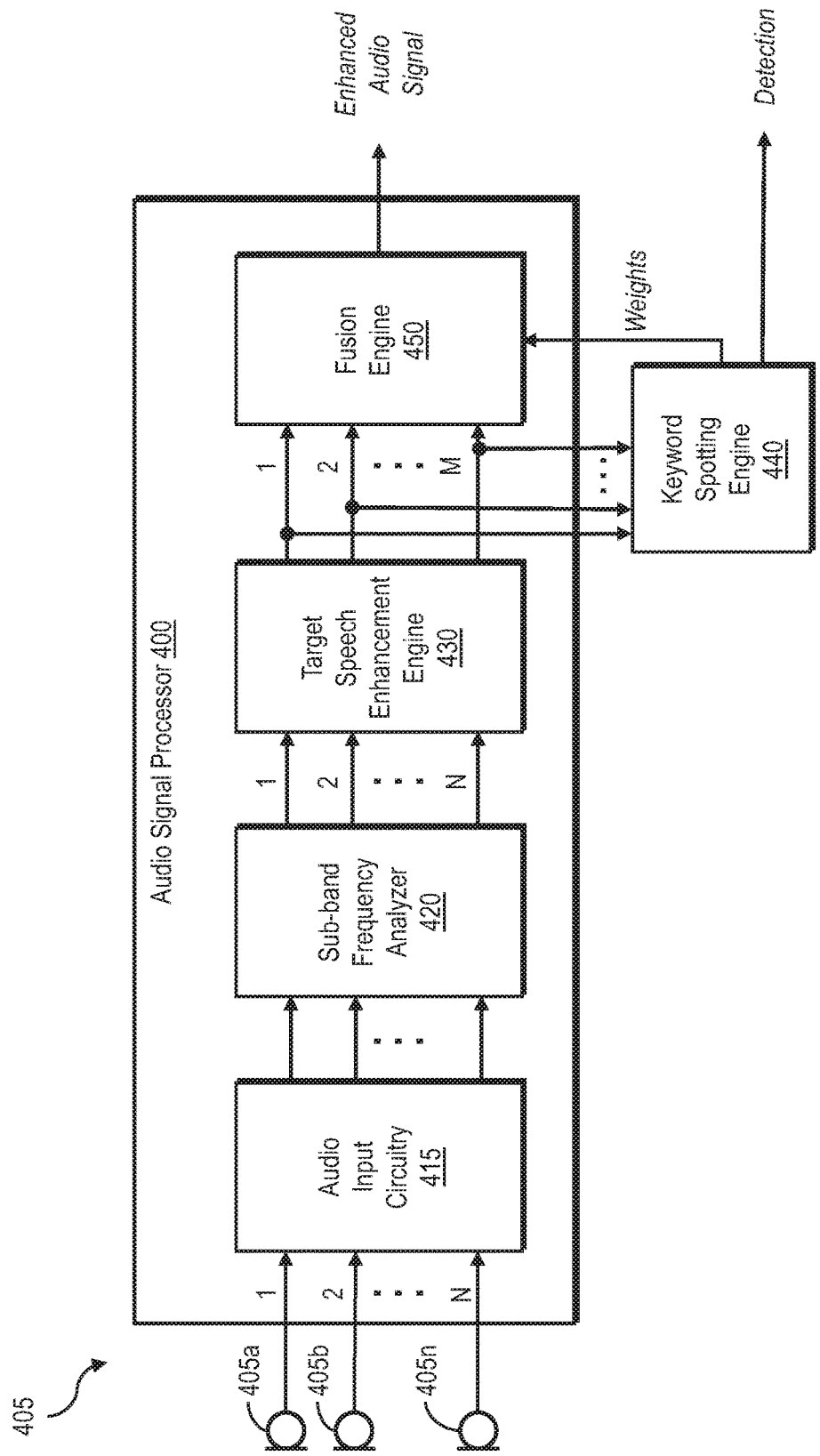
FIG. 4 illustrates example audio processing components for use in a keyword spotting system, in accordance with one or more embodiments of the present disclosure.

FIG. 4 illustrates an audio signal processor 400 according to various embodiments of the disclosure. In some embodiments, the audio signal processor 400 is embodied as one or more integrated circuits including analog and digital circuitry and firmware logic implemented by a digital signal processor, such as digital signal processor 324 of FIG. 3. As illustrated, the audio signal processor 400 includes audio input circuitry 415, a sub-band frequency analyzer 420, a target speech enhancement engine 430, a keyword spotting engine 440 and a fusion engine 450.

The audio signal processor 400 receives a multi-channel audio input from a plurality of audio sensors, such as a sensor array 405 comprising a plurality of audio sensors 405a-n. The audio sensors 405a-405n may include microphones that are integrated with an audio processing device, such as the audio processing device 300 of FIG. 3, external components connected thereto, or other arrangements for providing real time, multichannel audio input to audio signal processor 400.

The audio signals may be processed initially by the audio input circuitry 415, which may include anti-aliasing filters, analog to digital converters, and/or other audio input circuitry. In various embodiments, the audio input circuitry 415 outputs a digital, multichannel, time-domain audio signal having N channels, where N is the number of sensor (e.g., microphone) inputs. The multichannel audio signal is input to the sub-band frequency analyzer 420, which partitions the multichannel audio signal into successive frames and decomposes each frame of each channel into a plurality of frequency sub-bands. In various embodiments, the sub-band frequency analyzer 420 includes a Fourier transform process and the output comprises a plurality of frequency bins. The decomposed audio signals are then provided to the target speech enhancement engine 430. The speech target enhancement engine 430 is configured to analyze the frames of the audio channels and generate a signal that includes the desired speech. The target speech enhancement engine 430 may include a voice activity detector configured to receive a frame of audio data and make a determination regarding the presence or absence of human speech in the frame. In some embodiments, the speech target enhancement engine detects and tracks multiple audio sources and identifies the presence or absence of human speech from one or more target sources. The target speech enhancement engine 430 receives the sub-band frames from the sub-band frequency analyzer 420 and enhances a portion of the audio signal determined to be the speech target and suppresses the other portions of the audio signal which are determined to be noise, in accordance with the multi-stream keyword detection and channel selection systems and methods disclosed herein. In various embodiments, the target speech enhancement engine 430 reconstructs the multichannel audio signals on a frame-by-frame basis to form a plurality of enhanced audio signals, which are passed to the keyword spotting engine 440 and fusion engine 450. The keyword spotting engine 440 calculates weights to be applied to each of the plurality of enhanced audio signals and determines a probability that the keyword has been detected in the enhanced audio signals. The fusion engine 450 then applies the weights to the plurality of enhanced audio signals to produce an output enhanced audio signal that enhances the keyword for further processing.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. A system comprising:
a target-speech enhancement engine configured to analyze a multichannel audio input signal and generate a plurality of enhanced target streams using different enhancement separation criteria for each of the plurality of enhanced target streams;
a multi-stream target-speech detector generator comprising a plurality of target-speech detector engines each configured to determine a confidence of quality and/or a presence of a specific target-speech in the plurality of enhanced target streams, wherein the multi-stream target-speech detector generator is configured to determine a plurality of weights associated with the plurality of enhanced target streams; and
a fusion subsystem configured to apply the plurality of weights to the plurality of enhanced target streams to generate a combined enhanced output signal.

2. The system of claim 1, further comprising an audio sensor array configured to sense human speech and environmental noise and generate a corresponding multichannel audio input signal comprising the sensed human speech and environmental noise.

3. The system of claim 1, wherein the target-speech enhancement engine comprises a plurality of speech enhancement modules, each speech enhancement module configured to analyze the multichannel audio input signal and output one of the plurality of enhanced target streams.

4. The system of claim 3, wherein the plurality of speech enhancement modules comprise an adaptive spatial filtering algorithm, a beamforming algorithm, a blind source separation algorithm, a single channel enhancement algorithm, and/or a neural network.

5. The system of claim 1, wherein at least one of the target-speech detector engines comprises Gaussian Mixture Models, Hidden Markov Models, and/or a neural network.

6. The system of claim 1, wherein each of the target-speech detector engines is further configured to produce a posterior weight correlated to a confidence that an input audio stream includes the specific target-speech.

7. The system of claim 6, wherein each of the target-speech detector engines is further configured to produce a higher posterior with clean speech.

8. The system of claim 1, wherein the enhanced output signal is a weighted sum of the plurality of enhanced target streams.

9. The system of claim 1, wherein the multi-stream target-speech detector generator is further configured to determine a combined probability of detecting a specific target-speech in the plurality of enhanced target streams, and wherein the target-speech is detected if the combined probability exceeds a detection threshold.

10. The system of claim 9, further comprising an automatic speech recognition engine or a Voice-over-IP (VoIP) application, and wherein the enhanced output signal is forwarded to the automatic speech recognition engine or the VoIP application if the target-speech is detected.

11. A method comprising:
analyzing, using a target-speech enhancement engine, a multichannel audio input signal and generating a plurality of enhanced target streams using different enhancement separation criteria for each of the plurality of enhanced target streams;
determining a probability of detecting a target-speech in each of the plurality of enhanced target streams using a multi-stream target-speech detector generator;
calculating a weight for each of the plurality of enhanced target streams; and
applying the calculated weights to each of the plurality of enhanced target streams to generate an enhanced output signal.

12. The method of claim 11, further comprising sensing human speech and environmental noise, using an audio sensor array, and generating a corresponding multichannel audio input signal comprising the sensed human speech and environmental noise.

13. The method of claim 11, wherein analyzing the multichannel audio input signal comprises applying a plurality of speech enhancement modalities, each speech enhancement modality outputting a separate one of the plurality of enhanced target streams.

14. The method of claim 13, wherein the plurality of speech enhancement modalities comprises an adaptive spatial filtering algorithm, a beamforming algorithm, a blind source separation algorithm, a single channel enhancement algorithm, and/or a neural network.

15. The method of claim 11, wherein determining the probability of detecting the target-speech in each of the plurality of enhanced target streams comprises applying Gaussian Mixture Models, Hidden Markov Models, and/or a neural network.

16. The method of claim 11, wherein determining the probability of detecting the target-speech in each of the plurality of enhanced target streams comprises producing a posterior weight correlated to a confidence that an input stream includes a keyword.

17. The method of claim 16, further comprising producing a higher posterior with clean speech.

18. The method of claim 11, wherein the enhanced output signal is a weighted sum of the plurality of enhanced target streams.

19. The method of claim 11, further comprising determining a combined probability of detecting the target-speech in the plurality of enhanced target streams; and wherein the target-speech is detected if the combined probability exceeds a detection threshold.

20. The method of claim 19, further comprising performing automatic speech recognition on the enhanced output signal if the target-speech is detected.

* * * * *